United States Patent [19]

Hine

[11] Patent Number: 4,716,559

[45] Date of Patent: Dec. 29, 1987

[54] INTEGRATED OPTICAL DEVICE WITH IMPROVED ISOLATION BETWEEN THE SEMICONDUCTOR LASER AND THE PHOTODETECTORS

[75] Inventor: Shiro Hine, Itami, Japan

[73] Assignee: Mitsubishi Denki Kabushiki Kaisha, Tokyo, Japan

[21] Appl. No.: 900,792

[22] Filed: Aug. 27, 1986

[30] Foreign Application Priority Data

Aug. 28, 1985 [JP] Japan ................................ 60-191012

[51] Int. Cl.[4] .......................... G02B 6/10; G02B 6/32; G11B 7/135
[52] U.S. Cl. ..................................... 369/112; 369/121
[58] Field of Search ........................... 350/96.13, 96.14; 369/112, 121

[56] References Cited

U.S. PATENT DOCUMENTS 4,425,023  1/1984  Matsumoto et al. ............. 350/96.14
4,478,483 10/1984  Sprague ........................... 350/96.14

FOREIGN PATENT DOCUMENTS 3534776  9/1985  Fed. Rep. of Germany .
3536497 10/1985  Fed. Rep. of Germany .
3546012 12/1985  Fed. Rep. of Germany .
53-13819  2/1978  Japan .

OTHER PUBLICATIONS

"High-Performance Focusing Grating Coupler Fabricated by Electron-Beam Writing", T. Suhara et al., *Technical Digest of Seventh Topical Meeting on Integrated and Guide-Wave Optics*, ThD4; Florida, U.S.A., Apr. 24–26 (1984).

"Integrated Optical Photodetector", D. B. Ostrowsky et al., *Appl. Phys. Lett.*, vol. 22, No. 9, 1 May 1973, pp. 463–464.

*Primary Examiner*—Raymond F. Cardillo
*Assistant Examiner*—James E. Tomassini
*Attorney, Agent, or Firm*—Lowe, Price, Leblanc, Becker & Shur

[57] ABSTRACT

An optical head for a laser memory disk in accordance with the present invention containing a substrate (1); a waveguide layer (3) formed over a main surface of the substrate; a semiconductor laser (4) provided at an end of the waveguide layer for injecting laser beams into the waveguide; a focusing grating coupler (6) formed on the waveguide layer for focusing the injected laser beams on the disk and introducing beams reflected back from the disk into the waveguide; beam splitters (5) formed on the waveguide layer between the semiconductor laser and the focusing grating coupler, for bisecting each of the reflected beams at a prescribed acute angle; photodetectors (10) for converting the bisected beams into electrical signals; optical isolators (17, 18) formed between the semiconductor laser and the photodetectors.

10 Claims, 2 Drawing Figures

INTEGRATED OPTICAL DEVICE WITH IMPROVED ISOLATION BETWEEN THE SEMICONDUCTOR LASER AND THE PHOTODETECTORS

BACKGROUND OF THE INVENTION

1. Field of the Invention

The present invention generally relates to an optical device, and more particularly to an optical head which can precisely focus a light spot on an optical memory disk and has a high S/N ratio.

2. Description of the Prior Art

A high-performance focusing grating coupler fabricated by electron-beam writing is described by T. Suhara et al. in Technical Digest of Seventh Topical Meeting on Integrated and Guided-Wave Optics, ThD4; Florida, U.S.A., Apr. 24-26 (1984). Further, an integrated optical photodetector is disclosed by D. B. Ostrowsky et al. in Appl. Phys. Lett. Vol. 22, No. 9, 1973, p. 463.

FIG. 1 is a schematic perspective view of an optical head which is integrated electro-optically according to the prior art. A substrate 1 is provided with a buffer layer 2 on which an optical waveguide layer 3 of a dielectric is formed. The buffer layer 2 can be formed by oxidation, evapolation or the like, while the waveguide layer 3 can be formed by evapolation, sputtering or the like. Beam splitters 5 and a focusing grating coupler 6 are fabricated on the waveguide layer 3 by photolithography or combination of electron writing and plasma etching. The optical head is further provided with a semiconductor laser 4 and photodetectors 10.

In operation, laser beams 7 are injected into the waveguide layer 3 from the semiconductor laser 4. The laser beams 7 transmitted through the waveguide 3 are focused on an optical memory disk 8 by the focusing grating coupler 6 and make a focused light spot 12. After reading a signal pit 9 on the disk 8 by the focused light spot 12, light beams 13 reflected from the disk 8 are again introduced into the waveguide layer 3 by the focusing grating coupler 6. Each of these laser beams introduced back into the waveguide 3 is bisected by the beam splitter 5 and then the bisected beams 15 change their direction at 30° oppositely. One set of the bisected beams 15 converges toward one set of photodetectors 10 which are situated near to one side of the semiconductor laser 4, while the other set of the bisected beams 15 converges toward another set of photodetectors 10 which are situated near to the other side of the semiconductor laser 4. These convergent beams 15 are efficiently converted into electrical signals by the respective photodetectors 10.

Since the waveguide layer 3 is also formed between the semiconductor laser 4 and the photodetectors 10 in the electro-optically integrated head of FIG. 1, there may exist the so-called stray beams 16 which are emitted divergently from the semiconductor laser 4 and are directly incident upon the photodetectors 10. These stray beams 16 cause noise in output of the photodetectors 10 and thus lower the S/N ratio of the optical head.

SUMMARY OF THE INVENTION

In view of the prior art, it is a major object of the present invention to provide an optical head which is improved in the S/N ratio.

An optical head for a laser memory disk in accordance with the present invention comprises: a substrate; a waveguide layer formed over a main surface of the substrate; a semiconductor laser provided at an end of the waveguide layer for injecting laser beams into the waveguide; a focusing grating coupler formed on the waveguide layer for focusing the injected laser beams on the disk and introducing beams reflected back from the disk into the waveguide; beam splitter means formed on the waveguide layer between the semiconductor laser and the focusing grating coupler, for bisecting each of the reflected beams at a prescribed acute angle; photodetector means for converting the bisected beams into electrical signals; optical isolator means formed between the semiconductor laser and the photodetector means.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
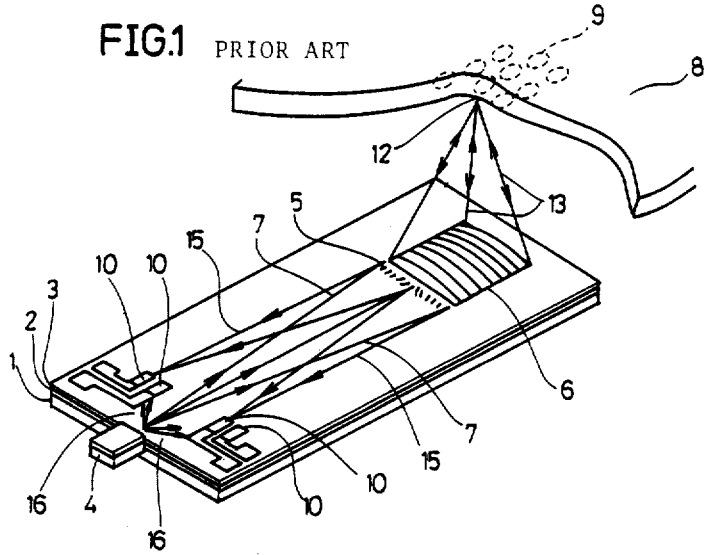
FIG. 1 is a schematic perspective view of an optical head according to the prior art.
Figure 2:
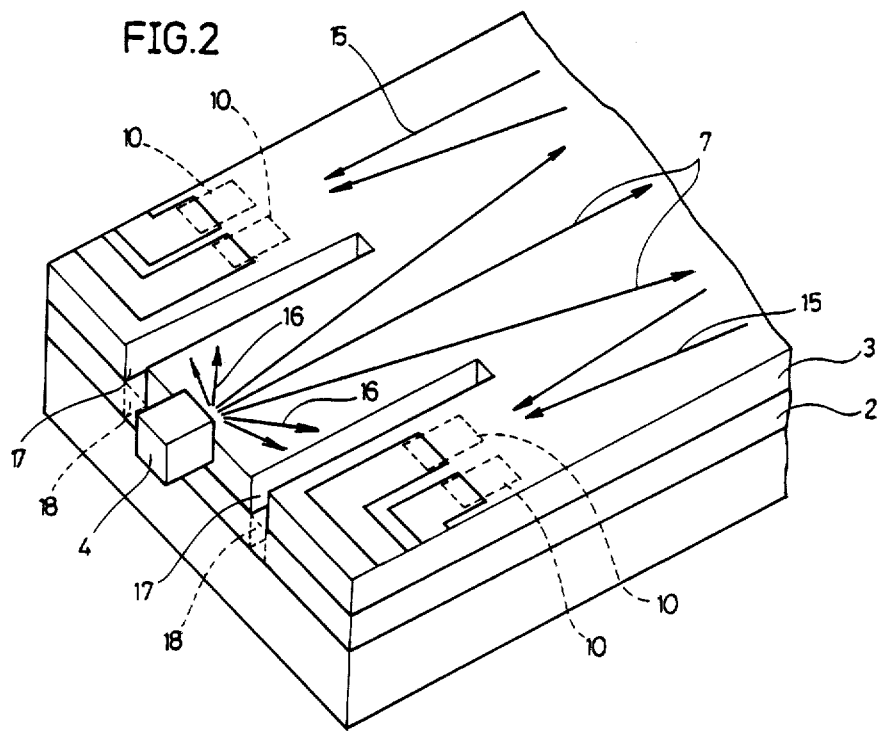
FIG. 2 is an enlarged fragmentary perspective view of an optical head in accordance with the present invention.

Referring to FIG. 2, there is shown only a distinctive portion of an optical head according to an embodiment of the present invention. The optical head of FIG. 2 is similar to that of FIG. 1, except that optical isolators 17 are formed between the semiconductor laser 4 and the photodetectors 10. The optical isolators 17 comprise grooves which are cut in the waveguide layer 3 between the semiconductor laser 4 and the photodetectors 10.

In operation, the optical head of FIG. 2 functions similarly as that of FIG. 1 does. In the optical head of FIG. 2, however, the stray beams 16 emitted divergently from the semiconductor laser 4 are prevented from directly entering the photodetectors 10, because the stray beams 16 directed to the photodetectors 10 are reflected or scattered by the optically discontinuous grooves 17. Although the grooves 17 are extended long enough to prevent the stray beams 16 from directly entering the photodetectors 10, the length of the grooves 17 must be limited not to interfere with the convergent beams 15 reflected back from the disk 8.

As a result, the optical isolators 17 decrease noise in output of the photodetectors 10 without lowering the signal level and thus increase the S/N ratio of the optical head.

Although only one groove 17 is shown near to each side of the semiconductor laser 4 in FIG. 2, a plurality of grooves 17 may be provided along each side of the semiconductor laser 4 in order to ensure complete optical isolation. Further, although the grooves 17 are cut only in the waveguide layer 3 in the above described embodiment, they may be deepened into the buffer layer 2 as shown by phantom lines 18 in FIG. 2. Still further, those grooves 17 (and 18) may be coated or buried with a reflective substance such as aluminium or an absorptive substance such as polycrystalline silicon according to circumstances.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording and reproducing head for a laser memory disk, comprising:
   a substrate (1);
   a waveguide layer (3) formed over a main surface of said substrate;
   a semiconductor laser (4) provided at an end of said waveguide layer for injecting laser beams into said waveguide;
   a focusing grating coupler (6) formed on said waveguide layer for focusing said injected laser beams on said disk and introducing beams reflected back from said disk into said waveguide;
   beam splitter means (5) formed on said waveguide layer between said semiconductor laser and said focusing grating coupler, for bisecting said reflected beams into two distinct directions, each distinct direction being at a prescribed acute angle;
   photodetector means (10) for converting said bisected beams into electrical signals;
   optical isolator means (17, 18) formed between said semiconductor laser and said photodetector means comprising at least one groove of a prescribed length which is cut with at least partial depth into said waveguide layer along each side of said semiconductor laser.

2. The optical head in accordance with claim 1, wherein said grooves are coated with a reflective substance.

3. The optical head in accordance with claim 1, wherein said grooves are coated with an absorptive substance.

4. The optical head in accordance with claim 1, wherein said grooves are buried with a reflective substance.

5. The optical head in accordance with claim 1, wherein said grooves are buried with an absorptive substance.

6. The optical head in accordance with claim 1 further comprising a buffer layer (2) interposed between said substrate and said waveguide layer, wherein said grooves are deepened into at least a partial depth of said buffer layer.

7. The optical head in accordance with claim 6, wherein said grooves are coated with a reflective substance.

8. The optical head in accordance with claim 6, wherein said grooves are coated with an absorptive substance.

9. The optical head in accordance with claim 6, wherein said grooves are buried with a reflective substance.

10. The optical head in accordance with claim 6, wherein said grooves are buried with an absorptive substance.

* * * * *

UNITED STATES PATENT AND TRADEMARK OFFICE
CERTIFICATE OF CORRECTION

PATENT NO. : 4,716,559
DATED : December 29, 1987
INVENTOR(S) : Shiro Hine

It is certified that error appears in the above-identified patent and that said Letters Patent is hereby corrected as shown below:

<u>IN THE TITLE</u>

After the word "OPTICAL" insert --HEAD--.

Signed and Sealed this

Twenty-eighth Day of June, 1988

Attest:

DONALD J. QUIGG

*Attesting Officer*  *Commissioner of Patents and Trademarks*